United States Patent [19]

Marcantonio et al.

[11] 4,341,878
[45] Jul. 27, 1982

[54] COMPOSITIONS FOR TREATING ALUMINUM SURFACES FOR TARNISH RESISTANCE

[75] Inventors: Arnold F. Marcantonio; Paul J. Kress; John W. Powers, all of Muncie, Ind.

[73] Assignee: Ball Corporation, Muncie, Ind.

[21] Appl. No.: 161,794

[22] Filed: Jun. 23, 1980

Related U.S. Application Data

[63] Continuation of Ser. No. 5,280, Jan. 22, 1979, abandoned.

[51] Int. Cl.$^3$ ............................................. C08K 3/34
[52] U.S. Cl. ................................. 524/3; 106/80; 427/388.4; 427/397.8; 428/463; 524/5; 524/442
[58] Field of Search ............. 260/29.6 S, 29.6 SQ, 260/29.6 H, 29.6 B; 106/14.21, 14.39, 80, 81; 427/388.4, 397.8

[56] References Cited

U.S. PATENT DOCUMENTS

| | | | |
|---|---|---|---|
| 2,699,407 | 1/1955 | Martens | 428/450 |
| 3,297,616 | 1/1967 | Fisher | 260/29.6 |
| 3,450,661 | 6/1969 | Neel | 260/29.6 |
| 3,884,863 | 5/1975 | Beers | 260/29.6 S |
| 4,002,590 | 1/1977 | Yoshida | 260/29.6 S |
| 4,169,916 | 10/1979 | Tsutsui | 428/467 |
| 4,194,918 | 3/1980 | George | 106/80 |

FOREIGN PATENT DOCUMENTS 52-40448  3/1977  Japan.

*Primary Examiner*—Paul R. Michl
*Attorney, Agent, or Firm*—Gilbert E. Alberding

[57] ABSTRACT

The subject invention relates to compositions of matter for treating aluminum surfaces for rendering them tarnish and corrosive resistant. The compositions comprise an alkali metal silicate including sodium and potassium and lithium silicates and a soluble organic polymer having displaceable hydrogens or displaced hydrogens. The organic polymers having displaceable hydrogens may be derived from hydroxyls, carboxylic acids, amides, sulfonic acids, carbohydrates, and phosphoric acids. The composition may be readily applied by spraying or dipping them in concentration less than about 5% in an aqueous system.

9 Claims, No Drawings

COMPOSITIONS FOR TREATING ALUMINUM SURFACES FOR TARNISH RESISTANCE

This is a continuation of application Ser. No. 005,280, filed Jan. 22, 1979, now abandoned.

BACKGROUND OF THE PRIOR ART

This invention relates to novel and useful improvements in chemical compositions that impart tarnish and corrosion resistance to metal articles and, in particular, relates to compositions of matter and methods for their application for treating aluminum containers to render them stain and corrosion resistant.

As is known, when metal surfaces are exposed to hot aqueous solutions, especially aluminum surfaces, for extended periods of time there is a marked tendency for such surfaces to tarnish to a brown or black coloration. Apparently, this coloration is a refractive effect of the light as it passes through amorphous platelets of generally hydrated aluminum oxides that deposit and build up on the surface of the metal. This problem becomes acute in certain industries. For example, it has been the general practice in breweries to pasteurize alcoholic beverages such as ale, stout and beer in metal containers and this is generally done by subjecting the cans to hot water baths or sprays in the range of about 140° F. to about 170° F. In subjecting metal containers to hot water there is a marked tendency for the metal surface, especially aluminum, to stain upon exposure and this is especially noted on the bottom portions of the containers. In practice, the severest problem of staining or discoloration is encountered during pasteurizing of the package as no organic coating is applied to the container bottom to protect it from corrosion and if left untreated, it will discolor during pasteurization, turning brownish. While seemingly this effect does not harm the contents thereof, it makes the product unappealing in its appearance to the consumer. Heretofore it has been a practice in the art to apply a so-called conversion coating to metal containers in order to suppress or passivate such metal and to prevent tarnishing as well as to promote the adhesion of inner lacquers and outer coatings of ink, paints and the like.

Various corrosion inhibitors have been used commercially such as inorganic ions including chromates and phosphates and are referred to as conversion coatings. Generally, the surface to be treated is subjected to an aqueous solution containing such ions. It is believed that these inorganic ions or heavy metal ions have the ability to bond or adhere in the form of insoluble oxides which resist tarnishing and corrosion of the metal surface. In general, the conversion coating solution is prepared and sprayed at some elevated temperature for a short period of time. After treating the metal surface with the solution, the surface is thoroughly rinsed with water to remove unreacted coating solution. However, in spite of the advantages of these corrosion inhibiting solutions, these inorganic ions have come under increasing scrutinization by environmental groups and governmental agencies with the result that there has been an increasing demand for compositions that do not have these detrimental heavy metal ions.

BRIEF SUMMARY OF THE INVENTION

It is accordingly an object of the present invention to provide a composition of matter that offers stain and tarnish resistance to metal substrates, the composition of matter having absent therefrom any heavy metal ions.

It is another principal object of the instant invention to provide a method of passivating metallic surfaces to render such surfaces stain and corrosion resistant by means of aqueous solutions having small but effective concentrations of ingredients which are not detrimental to the environment.

It is still another object of the subject invention to provide means for protecting surfaces of aluminum and aluminum base stock again tarnish and corrosion and at the same time enhancing the same for receiving other coatings thereon.

Still a further object of this invention is that it provides aqueous coating solutions which are free of toxic materials and which are capable of forming on an aluminum surface a uniformly clear and colorless coating.

It is still a further object of this invention to provide novel compositions of matter that protect surfaces of aluminum from blackening or other discoloration when exposed to hot or boiling water, especially during pasteurization processes associated with aluminum containers.

These and other objects of the invention will become more readily apparent from a review and study of the specification, including the examples and claims herein.

Briefly, in accordance with this invention, a solution for surface treating a metal to render the surface thereof tarnish and corrosion resistant is described and claimed, said solution comprising an alkali metal silicate and a water-soluble organic polymer having displaceable hydrogens or displaced hydrogens. The instant invention also relates to treating aluminum surfaces, the surfaces being protected against tarnish and corrosion by applying a solution comprising alkali metal silicates, a water-soluble organic polymer having displaceable hydrogens or displaced hydrogens and water.

Metal surfaces treated by the process of this invention remain stain and corrosion resistant over a long period of time and do not have to be further treated or coated. Furthermore, the compositions herein do not present toxic materials and do not have any disposal problems. Thus, the subject compositions are free of chromium ions and of the chromium subgroup of the Periodic Table and also materials such as ferricyanide and ferrocyanide.

DESCRIPTION OF THE INVENTION

The particular group of silicates that have been found to be effective herein are those aqueous silicates such as sodium, potassium or lithium, or mixtures of such silicates. These silicates are known generally as water glasses and are usually aqueous solutions containing numerous varieties of alkali metal silicates, e.g., $M_2O \cdot SiO_2$; $M_2O \cdot 2SiO_2$; $M_2O \cdot 3SiO_2$; $M_2O \cdot 4SiO_2$; $M_2O \cdot 5SiO_2$ and may be represented generally as

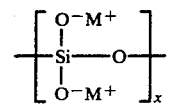

where M is sodium, potassium or lithium and x is an integer, generally between 1 and 10.

In general these aqueous silicate solutions have a specific gravity range from about 1.3 to about 1.6 and comprise about 23 to about 48 percent by weight of the alkali metal silicate. Effective silica to metal oxide weight ratios range from about 1.87 to about 10.0.

The useful polymers of the subject invention are organic, polymeric substances having displaceable or displaced hydrogens and are generally derived by polymerization of at least one monoolefinic compound through an aliphatic unsaturated group to yield a water-soluble synthetic polymer having a structure substantially free of cross-linkage. In general, the polymers herein are those water-soluble polymers having a linear polymeric structure of carbon or carbon with some other atom such as oxygen and contain in a pendent side chain a hydrophilic group from the class consisting of hydroxyl, carboxylic acids, carboxylic acid amides, sulfonic acids and phosphoric acids. It will be appreciated that in its broadest aspect the aforementioned polymers fall into two classes, (1) those consisting of polymeric organic substances which in an aqueous medium will form organic anions having a substantial number of negative charges distributed at a multiplicity of positions on the polymer, and (2) those consisting of polymeric organic substances which in an aqueous medium will not form ions but nonetheless contain a sufficient number of hydrophilic groups to be water-soluble. The first class of polymers may be referred to as anionic organic polymers and the second class may be called non-ionic organic polymers.

Very small concentrations of the ingredients herein defined have been found effective for improving the corrosion resistance. The synthetic organic polymers containing only carboxylic acid, sulfonic acid, phosphoric acid, as well as the salts thereof in a side chain are anionic and those that contain hydroxy and carboxylic acid amide in the side chain are non-ionic. Natural carbohydrates have been found effective herein and included the highly branched polymers of acacia gum. The invention herein contemplates polymers that contain either the anionic or non-ionic groups as well as mixtures thereof.

The composition herein may be readily formulated in an aqueous media. The organic and inorganic ingredients may be mixed in any order into water. Preferably, the compositions are prepared by mixing the components in a given amount of water with constant stirring within ambient temperatures until the ingredients go fully into solution.

The preferred range for both the alkali metal silicates and soluble polymers should be between about 0.05 and about 5 weight percent. At its most preferred embodiment a mixture of the alkali metal silicate and soluble polymer should be present at about 3 weight percent based on the total weight of the solution. Lower concentrations do not produce an appreciable improvement in corrosion characteristics, and higher concentrations do not increase these characteristics, generally, any further. To these compositions may be readily added other various ingredients that are compatible with the system. Such ingredients include wetting agents, dyes, pigments and germacides. The compositions herein described and claimed may be readily applied by various conventional means known to the art and including dipping, spraying, immersion, and roll-on techniques. It is believed that the compositions herein can be readily applied most economically and effectively by spraying.

The following tabulation gives Examples comprising compositions as defined herein that were prepared with the amount indicated in grams per liter for the ingredients. To each of Examples 8–20 were added about 0.01 grams of a commercial wetting agent, Triton X-100. Each formulation was placed in contact with an aluminum coupon for about two (2) minutes, at the temperature indicated and thereafter rinsed and dried. The thus-treated coupons were thereafter submerged for fifteen (15) minutes at about 75° C., in a standard solution comprising an aqueous solution of 220 ppm $NaHCO_3$ and 83 ppm NaCl. The processing conditions of temperature, contact time, and contact method are interdependent. In general, application of the compositions herein is conventionally by spray technique and, considering normal plant operations, the temperature of the solution will normally be from 30° to 90° C., preferably about 35° to about 60° C., and the contact time will be between about 15 and 90 seconds and usually less than 70 seconds. Two commercial formulations were also tested as indicated in the table. The ratings in the respective columns represent the amount of discoloration for each example.

It will be appreciated that is has been found in accordance with the present invention that aqueous coating solutions containing an alkali metal silicate and a water-soluble organic polymer of the anionic, non-ionic type or mixtures thereof are effective in protecting aluminum surfaces. The corrosion resistant properties of the coating formed by applications of such solutions within the scope of the present invention include the ability of the coating to withstand blackening or other discoloration when subjected to boiling water for a period of time of at least two minutes or longer.

The particular compositions of the present invention can be used to protect pure aluminum or alloys of aluminum, for example, aluminum alloys containing minor amounts of metals such as, for example, magnesium, manganese, copper and silicon. Presently, two of the most common alloys used in the aluminum container industry are aluminum alloys 3003 and 3004.

After the coating compositions are applied the surfaces may be dried by conventional means such as an oven having forced circulation of hot air. After the coating has dried it can be readily subjected to lacquering or to decorative operations which can include applying to the surfaces inks, paints or other resin coating. With the methods and compositions of this invention very excellent adhesion of these decorative finishes is realized.

A large number of water-soluble polymers of both the anionic and non-ionic type may be readily employed. Illustrative of the non-ionic polymers are poly(vinyl alcohol), poly(acrylamide) and a number of organic polymeric coagulants of vegetable and cellulosic origin including Gum Arabic. Illustrative of the anionic types are poly(acrylic-co-acrylate), poly(acrylic acid), poly(maleic anhydride-co-methylvinyl ether), poly(styrene sulfonic acid), sodium poly(acrylate), sodium poly(methacrylate), poly(itaconic-co-vinyl acetate) and the like.

By poly(acrylic-co-acrylate) is meant those copolymers of acrylic acid, methacrylic acid, methyl methacrylate, and methylacrylate.

TABLE

| EXAMPLES, g/l | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 |
|---|---|---|---|---|---|---|---|---|---|---|---|---|---|---|---|---|---|---|---|---|---|---|---|
| Alkali Metal Silicates: | | | | | | | | | | | | | | | | | | | | | | | |
| Sodium silicate | 10 | 10 | 5 | 10 | 10 | 10 | | 10 | 20 | 10 | | 10 | 10 | 20 | 10 | 22 | 11 | 10 | 40 | 20 | | | |
| Potassium silicate | | | | | | | 10 | | | | | | | | | | | | | | | | |
| Lithium silicate | | | | | | | | | | | 10 | | | | | | | | | | | | |
| Water-Soluble Organic Polymers: | | | | | | | | | | | | | | | | | | | | | | | |
| Poly(acrylic-co-acrylate) | 10 | 10 | | | | | | | | | | 10 | 10 | | 10 | 5 | 10 | 20 | 10 | 40 | 20 | | |
| Poly(vinyl alcohol) | | | 1 | | | | | | | | | | | | | | | | | | | | |
| Poly(acrylic acid) | | | | 8 | | | | | | | | | | | | | | | | | | | |
| Gum Arabic | | | | | 10 | | | | | | | | | | | | | | | | | | |
| Poly(acrylamide) | | | | | | 10 | | | | | | | | | | | | | | | | | |
| Poly(maleic anhydride-co-methylvinyl ether) | | | | | | | 10 | | | | | | | | | | | | | | | | |
| Poly(styrene sulfonic acid) | | | | | | | | 10 | | | | | | | | | | | | | | | |
| Titanium phosphate | | | | | | | | | 40 | | | | | | | | | | | | | | |
| Chromium phosphate | | | | | | | | | | 10 | | | | | | | | | | | + | + | 0 |
| Control | | | | | | | | | | | | | | | | | | | | | | | |
| Exposure Temperature, °C. | 82 | 50 | 82 | 82 | 82 | 82 | 82 | 82 | 82 | 82 | 82 | 82 | 82 | 82 | 82 | 82 | 71 | 82 | 50 | 71 | 71 | 60 | 60 |
| RATINGS: | A | B | B | B | B | A | A | B | A | B | C | B | B | B | B | B | B | B | B | B | C | B | D |

Rating:
A: Bright
B: Loss of lustre
C: Light brown
D: Distinct brown

There has been disclosed herein a method of and a composition for treating aluminum metal surfaces, and in particular those metal surfaces that are subjected to hot water solutions and the like, especially in pasteurization processes for aluminum can bodies. In view of the specifications, those skilled in the art may have many modifications which fall within the true spirit and scope of this invention. It is intended that all such modifications be within the scope of the appended claim.

What is claimed is:

1. A composition for resisting tarnish on aluminum surfaces during exposure to hot water baths, said composition comprising about 0.01 to about 10 weight percent of a water-soluble portion containing about 10 to about 95 weight percent of an alkali metal silicate and about 5 to about 90 weight percent of an organic polymer selected from the group consisting of poly(acrylic-co-acrylate), poly(vinyl alcohol), poly(acrylic acid), poly(acrylamide), poly(maleic anhydride-co-methylvinyl ether), and poly(styrene sulfonic acid), and about 90 to about 99.99 weight percent water.

2. A composition as recited in claim 1 wherein the composition comprises about 0.01 to about 5 weight percent of the water-soluble portion and about 95 to about 99.99 weight percent water.

3. A composition as recited in claim 1 wherein the alkali metal silicate is present in an amount between about 50 and about 70 weight percent and the organic polymer is present in an amount between about 40 and about 50 weight percent.

4. A composition of matter comprising about 0.01 to about 3 weight percent of a water-soluble portion containing about 10 to about 95 weight percent of an alkali metal silicate and about 5 to 90 weight percent of an organic polymer selected from the group consisting of poly(acrylic-co-acrylate), poly(vinyl alcohol), poly(acrylic acid), poly(acrylamide), poly(maleic anhydride-co-methylvinyl ether), and poly(styrene sulfonic acid), and about 97 to about 99.99 weight percent water.

5. A composition of claim 4 wherein the alkali metal silicate is sodium silicate.

6. A composition of claim 4 wherein the water-soluble portion is about 0.6 weight percent.

7. A composition of matter consisting essentially of about 0.01 to about 3 weight percent of a water-soluble portion containing about 10 to about 95 weight percent of an alkali metal silicate and about 5 to about 90 weight percent of an organic polymer selected from the group consisting of poly(acrylic-co-acrylate), poly(vinyl alcohol), poly(acrylic acid), poly(acrylamide), poly(maleic anhydride-co-methylvinyl ether), and poly(styrene sulfonic acid), and about 97 to about 99.99 weight percent water.

8. A composition as in claim 7 wherein the alkali metal silicate is sodium silicate.

9. A composition as in claim 7 wherein the water-soluble portion is about 0.6 weight percent.

* * * * *